United States Patent [19]
Priester et al.

[11] Patent Number: 5,064,594
[45] Date of Patent: Nov. 12, 1991

[54] EXTRUSION PROCESS FOR DIFFICULTLY-MELT-PROCESSIBLE POLYMERS

[75] Inventors: Donnan E. Priester, Wilmington; Robert E. Tarney, Hockessin, both of Del.

[73] Assignee: E. I. Du Pont de Nemours and Company, Wilmington, Del.

[21] Appl. No.: 584,337

[22] Filed: Sep. 20, 1990

Related U.S. Application Data

[63] Continuation-in-part of Ser. No. 417,986, Oct. 6, 1989, abandoned.

[51] Int. Cl.$^5$ ............................................. B29C 47/94
[52] U.S. Cl. .................................... 264/127; 264/169; 264/176.1; 264/211; 264/300; 425/461; 425/467; 427/135
[58] Field of Search .................. 264/169, 176.1, 211, 264/300, 127; 425/461, 467; 427/135

[56] References Cited

U.S. PATENT DOCUMENTS

| | | | |
|---|---|---|---|
| 3,125,547 | 3/1964 | Blatz | 525/231 |
| 3,942,937 | 3/1976 | Prober et al. | 425/461 |
| 4,324,748 | 4/1982 | Hatakeyama et al. | 425/461 |
| 4,740,341 | 4/1988 | Chu | 264/211 |
| 4,812,267 | 3/1989 | Hoffmann et al. | 264/169 |
| 4,948,543 | 8/1990 | Pawlowski et al. | 264/176.1 |

FOREIGN PATENT DOCUMENTS

| | | | |
|---|---|---|---|
| 5058 | 1/1977 | Japan . | |
| 58-12743 | 1/1983 | Japan | 425/461 |
| 58-187441 | 11/1983 | Japan | 264/211 |
| 58-082734 | 1/1984 | Japan . | |
| 59-113059 | 4/1984 | Japan . | |
| 61-120720 | 6/1986 | Japan | 264/211 |
| 55543 | 4/1988 | Japan . | |

*Primary Examiner*—Jeffery Thurlow

[57] ABSTRACT

Improved process for extruding through a die a difficultly-melt-processible polymer, especially a polymer containing an additive such as an antiblock agent. There is first extruded through the die a polymer resin containing 0.001 to 1 wt. % of a copolymer of tetrafluoroethylene and a functional-group-containing monomer that is terminated in a -CF$_2$W group wherein W is selected from -SO$_2$F, -SO$_2$Cl, -SO$_3$M, -COOR and -COOM, R is a C$_{1-3}$ alkyl radical and M is H, a metal cation or an ammonium or quaternary ammonium cation, and thereafter there is extruded through the die the difficultly-melt-processible polymer admixed with 0.001–1 wt. % of a fluoropolymer process said having a fluorine to carbon ratio of at least 1:2.

25 Claims, No Drawings

5,064,594

EXTRUSION PROCESS FOR DIFFICULTLY-MELT-PROCESSIBLE POLYMERS

CROSS-REFERENCE TO RELATED APPLICATION

This is a continuation-in-part of Application Ser. No. 07/417,986 filed Oct. 6, 1989, allowed Aug. 27, 1990 and abandoned.

BACKGROUND OF THE INVENTION

1. Field of the Invention

This invention relates to an improved process for the extrusion of difficultly-melt-processible polymers.

2. Background

In the extrusion of difficultly-melt-processible polymer resins there are often flow regimes, determined by the rheological properties of the particular resin, where anomalous flow behavior occurs, leading to imperfections on the extrudate surfaces. Such imperfections, commonly called melt fracture, appear in different forms. The so-called "sharkskin" fracture occurs at lower shear rates and appears as a general, finely-structured and uniform roughness. In a blown-film extrusion, sharkskin fracture may appear as an undesirable herringbone pattern, reducing clarity and giving a dull surface. In practice this may occur at uneconomically low extrusion rates. At higher shear rates flow often becomes unstable and a non-uniform stick-slip melt fracture results, wherein alternating bands of glossy surface and sharkskin fracture appear. This behavior is especially undesirable in wire coating and in tube and pipe extrusions. Other recognized difficulties that occur during polymer extrusion include fluctuations in barrel and die pressure, torquing out because of excessively high pressures reached during fluctuation, and accumulation of degraded polymer and polymer additives at the die exit orifice.

In an effort to improve the extrusion behavior of polymer resins through metal dies it is known to coat the die surfaces that contact the flowing polymer melt with a slip agent, such as tetrafluoroethylene polymers and copolymers, as in Japanese Application Publication Kokai 55-82784, but bonding to the metal is poor, and over a period of time in use the slip layer is depleted and melt fracture resumes.

It is also known, as disclosed by Blatz in U.S. Pat. No. 3,125,547, that incorporation of 0.005-2.0 wt. % of an incompatible fluorocarbon polymer that is above its glass transition temperature if amorphous, or above its melting point, if crystalline, at the processing temperature, such as a fluoroelastomer or polyvinylidene fluoride, into linear low density polyethylene and other polyolefins will reduce die pressure and significantly increase the extrusion rate at which melt fracture occurs. U.S. Pat. No. 4,904,735 discloses the use of certain combinations of fluoropolymer process aids for achieving similar results.

In the practice of the teachings of the art, wherein a fluoropolymer process aid is added, the fluoropolymer contacts metal surfaces of the extruder and die parts and preferentially collects there, thus providing a low surface energy slip layer between the extruding resin melt and the metal surfaces. In commercial extrusions it is often a practice to add up to 1 wt. % of a finely divided talc or silica to the polyolefin as an antiblock agent. This practice can greatly diminish the beneficial effects of the fluorocarbon polymer additive as the antiblock agent may remove, for example, by abrasion, or displace the lubricating layer of fluorocarbon polymer that is relatively weakly adhered to the die surface, especially if the die is not clean. Moreover, purge compounds used to clean extruders and dies often contain chemical additives, such as stearates, and abrasives that collect on the die and seriously interfere with the adhesion and performance of fluoropolymer process aids in subsequent extrusions.

It is known to use as process aid additives in difficultly-melt-processible resins certain fluorinated polymers having —SO3M groups (wherein M is a metal ion), said fluorinated polymers being used either alone, as in Japanese Examined Publication Kokoku 55544/1988, or in combination with a perfluoroalkyl sulfonate salt, as in Japanese Examined Publication Kokoku 55543/1988. These additives are very expensive, and must be continuously present in the extruding resin.

It is an object of this invention to provide a die treatment process whereby the extrusion of difficultly-melt processible polymers containing fluorocarbon polymer process aids is greatly improved, especially in the presence of abrasive additives, such as antiblock agents.

SUMMARY OF THE INVENTION

Greatly improved extrusion of compositions comprising difficultly-melt-processible polymers containing fluoropolymer process aids blended therein is achieved by the process of this invention wherein, prior to extrusion of the composition through the extruder and the die, another composition comprising a polymer resin containing a functionalized fluorinated copolymer that is comprised of copolymerized units of tetrafluoroethylene and a functional-group-containing fluoromonomer is first passed through the extruder and the die. The extruder and die-treating polymers of this invention have a fluorinated backbone to which are attached pendant side chains that are terminated in carboxylic or sulfonic acid end groups.

More specifically, the invention resides in an extrusion process comprising:

(A) Extruding through an extrusion die, preferably for a period of at least 5 minutes, a composition comprising a polymer resin containing 0.001 to 1 wt. % of a polymer comprised of copolymerized units of tetrafluoroethylene and a functional-group-containing monomer that is terminated in a —CF$_2$W group wherein W is selected from —SO$_2$F., —SO$_2$Cl, —SO$_3$M, —COOR and COOM, wherein R is a C$_{1-3}$ alkyl radical and M is H, a metal cation, preferably an alkali metal cation, or an ammonium or quaternary ammonium cation; and subsequently (B) extruding through the extrusion die of step (A) a composition comprising a difficultly-melt-processible polymer and 0.001–1 wt. % of a fluoropolymer process aid having a fluorine to carbon ratio of at least 1:2, preferably at least 1:1.5.

DETAILED DESCRIPTION OF THE INVENTION

A major aspect of the process of this invention is to first extrude a composition comprising a polymer resin and 0.001 to 1.0 wt. %, preferably 0.01 to 0.2 wt. % of a functional-group-containing polymer through the extrusion die. The functional-group-containing polymer is comprised of copolymerized units of tetrafluoroethylene and a functional-group-containing monomer that is terminated in —CF$_2$W groups, wherein W is a carboxyl or sulfonyl group as defined above. Such a polymer will thus contain pendant side chains terminated in the —CF$_2$W group.

The pendant side chain may or may not contain an ether group. Polymers containing —(CF$_2$)$_p$W side chains, wherein p is 1–18, W is —COOR and R is a lower alkyl group of 1–3 carbon atoms are disclosed in U.S. Pat. No. 3,506,635 (hereby incorporated by reference).

In one preferred embodiment the pendant side chains have the structure

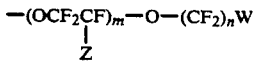

wherein W is —COOR, —SO$_2$Cl or —SO$_2$F, Z is —F or —CF$_3$, R is a lower alkyl group of 1–3 carbon atoms, m is 0–3, preferably 1, and n is 1–5, preferably 2; or more specifically, polymers containing as the pendant side chain the structure

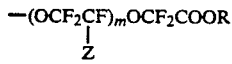

wherein Z and R are as defined above and m is 0–2, as disclosed in U.S. Pat. No. 4,267,364 (hereby incorporated by reference).

Polymers containing side chains with terminal —O(CF$_2$)$_n$COOR groups, wherein n is 2 to 12, are disclosed in U.S. Pat. No. 3,641,104, U.S. Pat. No. 4,178,218, U.S. Pat. No. 4,116,888, U.S. Pat. No. 4,329,434, U.S. Pat. No. 4,578,512, U.S. Pat. No. 4,508,603, all hereby incorporated by reference. Such groups may be part of the pendant side chains of the structure

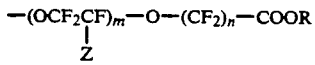

wherein Z is —F or —CF$_3$, m is 0–2, and n is 2–12. Especially preferred polymers containing the aforesaid side chains wherein n is 2 are described in U.S. Pat. Nos. 4,138,426 and 4,487,668, and wherein n is 3 are described in U.S. Pat. No. 4,065,366, all hereby incorporated by reference. Among these polymers, those wherein m is 1 and Z is —CF$_3$ are most preferred.

Processes for the preparation of these polymers will be apparent to those skilled in the art, particularly in view of the U.S. patents listed above.

The sulfonylated polymers that are useful as die-coating polymers in step (A) of the process of the invention are fluorinated polymers with side chains containing the group —CF$_2$SO$_2$X, wherein X is —F or —Cl, preferably —F. Ordinarily, the side chains will contain —OCF$_2$CF$_2$CF$_2$SO$_2$F or —OCF$_2$CF$_2$SO$_2$F groups, preferably the latter.

Polymers containing the side chain

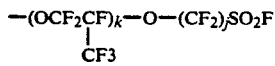

wherein k is 0 or 1 and j is 3, 4, or 5, are disclosed in U.S. Pat. No. 4,329,434 (hereby incorporated by reference).

Polymers containing the side chain —CF$_2$CF$_2$SO$_2$X wherein X is —F or —Cl are disclosed in U.S. Pat. No. 3,718,627 (hereby incorporated by reference).

Polymers containing the side chain

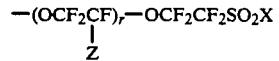

wherein Z and X are as defined above and r is 1, 2 or 3, are disclosed in U.S. Pat. No. 3,282,875 (hereby incorporated by reference). Especially preferred are copolymers containing the side chain

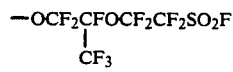

Processes for the preparation of all these polymers will be apparent to those skilled in the art, particularly in view of the U.S. patents listed above. An especially useful method comprises solution polymerization using ClCF$_2$CFCl$_2$ as solvent and (CF$_3$CF$_2$COO)$_2$ as initiator. Polymerization can also be carried out by means of aqueous granular polymerization techniques, such as disclosed in U.S. Pat. No. 2,393,967, or by aqueous dispersion polymerization techniques, such as disclosed in U.S. Pat. No. 2,559,752, followed by coagulation, as disclosed in U.S. Pat. No. 2,593,583, all hereby incorporated by reference.

In an important alternate embodiment of the process of the invention, the die-coating polymer has pendant side chains containing terminal functional groups that are present as the acid or salt form of the carboxyl or sulfonyl functionality. Such polymer side chains are terminated in —CF$_2$W groups wherein W is derived from the above-described polymer compositions by acid or basic hydrolysis. In preferred compositions of this alternate embodiment the pendant side chains have the structure

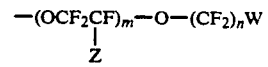

wherein W is —COOH, —COOM, —SO$_3$H or —SO$_3$M, M is a metal cation, preferably an alkali metal cation, or an ammonium or quaternary ammonium cation, Z is —F or —CF$_3$, m is 0–3, preferably 1, and n is 1–5, preferably 2.

Conversion of carboxylic ester or sulfonyl halide functional groups of a die-treating polymer to sulfonic or carboxylic acid or salt functional groups is ordinarily and conveniently accomplished by hydrolysis with acid or base, such that these functional groups are converted respectively, either partially or totally, to free acids or the metal salts thereof. Such hydrolysis can be carried out in an aqueous bath of mineral acid or metal hydroxide, preferably an alkali metal hydroxide.

The die-treating fluorinated copolymers described above contain about 0.5–40, preferably 4–40, mole % of the functional group-containing monomer. Suitable molecular weights are in the range 10,000–1,000,000, preferably 30,000 to 300,000.

The polymer resin used in the die treatment step (A) need not be, but is most advantageously, the same as the difficultly-melt-processible used in the extrusion step (B), as will be further described below. It may be desirable to avoid this practice if the functional group, —CF$_2$W, of the die-treatment fluoropolymer is reactive to the difficultly-melt-processible polymer, for example, a polyester or polyamide. In such instances the polymer resin of step (A) can be an inert polymer, such as a polyolefin.

The die-treatment step (A) is most advantageously, but not necessarily, carried out under the same general conditions as employed in step (B) of the process of the invention. Preferably, the extrusion step (A) is carried out for at least 5 minutes, more preferably at least 15 minutes, before carrying out process step (B). In step (B) of the process of the invention a composition comprising a difficultly-melt-processible polymer and a fluoropolymer process aid is extruded with improved extrusion behavior.

The term "extrusion behavior" is intended to include, individually or in combination, such parameters as the die pressure reached during extrusion and the power required to achieve such die pressure, the operating melt temperatures required for fracture-free extrudate surfaces, and the maximum extrusion rates that can be achieved while maintaining melt stability and good extrudate surface quality. Other factors include maintenance of a steady extrusion rate and absence of deposits of decomposed polymer or additives at the die exit. Thus, the difficultly-melt-processible polymers disclosed herein have much improved behavior with regard to one or more of the above factors, that is, reduced die pressure, higher allowed extrusion rates without melt fracture, and also, in the case of blown films, improved clarity, when the extrusion is carried out by the process of the invention.

As examples of difficultly-melt-processible polymers that are operable in the compositions and processes of the invention, the following are cited: polyolefins; vinyl aromatic polymers, such as polystyrene; copolymers of alpha-olefins, particularly ethylene, with vinyl esters, such as vinyl acetate and vinyl propionate, with (meth)acrylic esters, such as ethyl or methyl (meth)acrylate, with acrylonitrile, and with (meth)acrylic acids and their (ionomeric) metal salts; chlorinataed polyethylene; polyvinyl chloride; polyester; polyamide. Blends or alloys of difficultly-melt-processible polymers may also be employed in the processes of the invention. As used herein, the term "alloy" is intended to describe compositions obtained by melt compounding of polymeric components having co-reactive functional groups.

Difficultly-melt-processible polyesters are condensation polymers derived from dicarboxylic acids and dialcohols and/or from hydrocarboxylic acids or the corresponding lactones, such as polyethylene terephthalate, polybutylene terephthalate and and poly-1,4-dimethylolcyclohexane terephthalate.

Difficultly-melt-processible polyamides and copolyamides are derived from diamines and dicarboxylic acids and/or amino acids or the corresponding lactams, such as polyamide 6, polyamide 6/6, polyamide 6/10, polyamide 11 and polyamide 12.

When the difficultly-melt-processible polymer is a hydrocarbon polymer, used, for example, in blown film extrusion, it generally has a melt index (ASTM-D1238) at 190° C. of 5 or less, preferably 3 or less. For high shear melt processing, such as fiber extrusion or injection molding, even higher melt index resins, for example, having a melt index of 20 or more, may suffer extrusion difficulties. Such hydrocarbon polymers may comprise an elastomeric copolymer of ethylene and propylene, and optionally a non-conjugated diene monomer, for example 1,4-hexadiene, or, in general, any thermoplastic hydrocarbon polymer obtained by the homopolymerization or copolymerization of a monoolefin(s) having the formula CH$_2$=CHR$^1$ wherein R$^1$ is H or an alkyl radical, usually of not more than eight carbon atoms. In particular, this invention is applicable to polyethylene, both the high density type and the low density type, for example, having densities within the range 0.89 to 0.97; polypropylene; polybutene-1; poly(3-methylbutene); poly(methylpentene); and linear low density copolymers of ethylene and alpha-olefins, such as propylene, butene-1, hexene-1, octene-1, decene-1, octadecene, and 4-methylpentene-1.

Similarly, the invention is also applicable to blends of difficultly-melt-processible polymers, and difficultly-melt-processible polymers containing inorganic fillers and additives, such as antioxidants, light stabilizers, antiblocking agents and pigments.

Because of the differing melt properties of the various difficultly-melt-processible polymers operable herein, the invention may have greater utility with some polymers than with others. Thus, hydrocarbon polymers such as polypropylene and branched polyethylene that are not high in molecular weight have good melt flow characteristics even at low temperatures, so that surface roughness and other surface defects can be avoided by adjustment of extrusion conditions. Extrusion of such hydrocarbon polymers may only require the use of this invention under adverse extrusion conditions. However, other polymers, such as high molecular weight, high density polyethylene or linear low density polyethylene copolymers, particularly those with narrow molecular weight distributions, do not have this degree of freedom in the variation of extrusion conditions, and it is particularly with these resins that remarkable improvements in the surface quality of the extruded product are obtained by means of the invention.

In the practice of this invention the difficultly-melt-processible polymer contains 0.001–1.0 wt. %, preferably 0.01–0.5 wt. %, of a fluoropolymer process aid.

With respect to the fluorocarbon polymer process aid, it has been independently discovered that it must have an effective amount of polar functional groups selected from —COF, SO$_2$F, —SO$_2$Cl, —SO$_3$M, —O-SO$_3$M, —COOR, and —COOM, wherein R is a C$_{1-3}$ alkyl group and M is hydrogen, a metal cation, preferably an alkali or alkaline earth metal cation, or a quaternary ammonium cation. Such functionality is usually present in the process aid (1) as polymer chain end groups introduced during polymerization or copolymerization, (2) by copolymerization of an appropriate functional-group-containing monomer or (3) by subjecting the polymer to ionizing radiation.

Suitable fluoropolymer process aids include those that are capable of deformation under the shear stress conditions generated in the extrusion, as controlled by the viscosity of the difficultly-melt-processible resin, the extrusion rate, and the prevailing conditions of temperature, usually 200°–350 C., and pressure, usually 7–35 MPa, and can therefore be caused to flow over and coat the die surfaces. Thus, at processing temperature they should be above the temperature where stress-induced deformation by shear begins to occur. Hence, the temperature at which stress-softening under shear occurs preferably should be below 300° C., more preferably, below 250° C. The polymers should have sufficiently high molecular weight, with $M_n$ values greater than about 10,000, such that they do not exude from the polymer extrudate at use temperatures.

With respect to their chemical composition, the fluoropolymers should have a fluorine to carbon ratio of at least 1:2, preferably at least 1:5. Fluoropolymer process aids of this description generally are incompatible with the difficulty-melt-processible resins, and exist as a heterogeneous phase. They coat the extrusion die parts, thus providing a low surface energy slip layer faciliating the extrusion.

Process aids that are particularly advantageous in the invention are polyvinylidene fluoride and copolymers comprised of copolymerized units of vinylidene fluoride and hexafluoropropylene, optionally also containing units of tetrafluoroethylene, all of which are commercially available. Other representative fluoropolymer process aids include elastomeric copolymers of tetrafluoroethylene and propylene, elastomeric copolymers of tetrafluoroethylene, propylene and a small amount of vinylidene fluoride, copolymers of tetrafluoroethylene and a perfluoro(alkyl vinyl ether), preferably perfluoro(methyl vinyl ether), optionally containing a small amount (up to 2 mole %) of a third monomer, all of which are known in the art. The presence or absence of the third monomer is of no known consequence in this invention. Also useful are polytetrafluoroethylene that has been treated with 15-80 megarads of ionizing radiation, crystalline copolymers of tetrafluoroethylene and perfluoro(alkyl vinyl ethers), preferably perfluoro(propyl vinyl ether), and crystalline copolymers of tetrafluoroethylene and perfluoroolefins, preferably hexafluoropropylene. More than one process aid may be employed.

It will be recognized by those skilled in the art that for those resins that extrude at high temperatures and, in addition, are chemically sensitive, for example polyester, it is important to select fluorocarbon process aids that are thermally stable at the process temperatures. Generally speaking, such polymers are those that are very nearly or completely perfluorinated, such as copolymers of tetrafluoroethylene and other perfluoroolefins. Homopolymers and copolymers of vinylidene fluoride may dehydrohalogenate at temperatures in excess of about 250° C. and are of lesser utility under these conditions.

In addition to the fluoropolymer process aid, the difficultly-melt-processible polymer may also contain additional process aids, as are known in the art. For example, U.S. Pat. No. 4,740,341 discloses the use of combinations of vinylidene fluoride and polyalkysiloxane polymers in the extrusion of linear low density polyethylene films, and U.S. Pat. No. 4,829,116 discloses the use of fluoroelastomer process aids in admixture with certain waxes.

The dies and nozzles that are used in the practice of this invention will be of the type that are well known in industry and are used for injection molding or the extrusion of tubing and other shaped articles, or for blown film, and will be comprised of tool steel, stainless steel and other materials known in the art. They may optionally be plated with metals, such as chromium or nickel.

In the heretofore known use of fluoropolymer process aids, it has been found that the beneficial effects of the process aid are not necessarily observed immediately at the onset of extrusion of the difficultly-melt-processible hydrocarbon polymer, and depending on the extruder equipment used and the overall concentrations of the process aid, may take from 10 minutes to 8 hours to reach stable extrusion rate and die pressure, the longer times being required at low concentrations of the process aid. It has been discovered herein that the time required for onset of extrusion improvement is reduced by the practice of this invention. However, where it is desirable to operate at very low levels of process aid, or to hasten the achievement of equilibrium, it may be expedient to first "condition" the extruder rapidly using a composition containing 0.1 to 1 wt. %, of the fluoropolymer process aid and then to switch to the desired concentration of the said process aid.

The high molecular weight linear low density polyethylene (LLDPE) used in the following examples was a commercially available copolymer of ethylene and butene-1 and had density of 0.918 and a melt index (ASTM D-1238, cond. E) of 1.0. The fluoroelastomer was a commercially available copolymer having a nominal composition of 60 wt. % vinylidene fluoride and 40 wt. % hexafluoropropylene, and a Mooney viscosity, ML-4, of 60 at 100° C. It was used in the form of a 2 wt. % concentrate in polyethylene. Talc (Vertal ® 15) was added as a 10% masterbatch in polyethylene. The fluoroelastomer and talc masterbatches were dry blended with the LLDPE prior to extrusion. The extruder purge compound, DFD-0964, was supplied by Union Carbide Company.

EXAMPLES

COMPARATIVE EXAMPLE 1

A blown film extrusion of LLDPE was carried out using a Welex 6.35 cm. (2.5 in.) extruder equipped with a 15.24 cm (6.0 in.) rotating film die with a 0.76 mm. (0.030 in.) gap. The extruder had been previously cleaned by extrusion of purge compound. The screw was operated at 36 rpm, melt temperature was 232° C., take-up speed was 11.6 m./min.(38 ft./min.), blow-up ratio was 1.55, and the film thickness was approximately 0.02 mm. (0.001 in.). The extruded film had a herringbone-like melt fracture over the entire surface. A mixture of LLDPE containing 1000 ppm fluoroelastomer and 10,000 ppm talc was then extruded. After two hours the film showed some clear areas, but was mostly melt fractured as above. The fluoroelastomer level was increased to 1500 ppm and after 1.5 hrs. the film was approximately 75% clear but still showed streaks of melt fracture.

COMPARATIVE EXAMPLE 2

The extruder was cleaned by extrusion of purge compound and then LLDPE was extruded as in Comparative Example 1, with similar results. A blend containing 1% fluoroelastomer, as a preconditioning agent, was then extruded. After 10-15 min. a clear, fracture free film was obtained, and extrusion of the 1% masterbatch was continued for a total of 50 min. A blend containing 1500 ppm fluoroelastomer and 10,000 ppm talc was then extruded. Melt fracture streaks appeared within 30 min.

EXAMPLE 1

(A) The extruder was cleaned by extrusion of purge compound and then LLDPE containing 1000 ppm of a copolymer of tetrafluoroethylene and 16.2 mole % of perfluoro-3,6-dioxa-4-methyl-7-octene sulfonic acid (10-35 mesh granular powder, eq. wt 1060, obtained from Aldrich Chemical Co., Catalog No. 27673-1) was extruded in the equipment described in Comparative Example 1, under the same conditions, for 30 min., after which time the extrudate was clear and smooth.

(B) The feed of Part A was discontinued, and then a blend containing 10,000 ppm fluoroelastomer was extruded for 30 min., giving a clear, fracture-free film. The feed was then switched to a blend containing 1000 ppm of fluoroelastomer and 10,000 ppm of talc. A clear fracture-free film was obtained that did not exhibit melt fracture, and there were no changes in equilibrium extrusion pressures after 2 hrs. of continuous extrusion.

We claim:

1. Extrusion process comprising:
   (A) Extruding through an extrusion die a composition comprising a polymer resin containing 0.001 to 1 wt. % of a functionalized fluorinated copolymer comprised of copolymerized units of tetrafluoroethylene and a functional-group-containing monomer that is terminated in a —$CF_2W$ group wherein W is selected from —$SO_2F$, —$SO_2Cl$, —$SO_3M$, —COOR and —COOM, R is a $C_{1-3}$ alkyl radical and M is H, a metal cation or an ammonium or quaternary ammonium cation; and subsequently
   (B) extruding through the extrusion die of step (A) a composition comprising a difficultly-melt-processible polymer and 0.001–1 wt. % of a fluoropolymer process aid having a fluorine to carbon ratio of at least 1:2.

2. The process of claim 1 wherein step (A) is carried out for at least 5 minutes and the process aid has a fluorine to carbon ratio of at least 1:1.5.

3. The process of claim 1 wherein the composition of step (B) contains an inorganic filler.

4. The process of claim 1 wherein the difficultly-melt-processible polymer of step (B) is a polyolefin.

5. The process of claim 4 wherein the polyolefin is a homopolymer or copolymer of one or more olefins of the formula $R^1CH=CH_2$ wherein $R^1$ is H or alkyl.

6. The process of claim 5 wherein alkyl is $C_{1-8}$ alkyl.

7. The process of claim 4 wherein the polyolefin is high density polyethylene.

8. The process of claim 4 wherein the polyolefin is low density polyethylene.

9. The process of claim 4 wherein the polyolefin is linear low density polyethylene.

10. The process of claim 4 wherein the polyolefin is comprised of polymer repeat units of ethylene and propylene, and, optionally, a non-conjugated diene monomer.

11. The process of claim 1 wherein the amount of fluoropolymer process aid is 0.01–0.5 wt. %, based on the weight of difficultly-melt-processible polymer.

12. The process of claim 1 wherein the fluoropolymer process aid is polyvinylidene fluoride.

13. The process of claim 1 wherein the fluoropolymer process aid is polytetrafluoroethylene that has been irradiated with 15–80 megarads of ionizing radiation.

14. The process of claim 1 wherein the fluoropolymer process aid is a copolymer of monomers selected from the group vinylidene fluoride, hexafluoropropylene, chlorotrifluoroethylene, tetrafluoroethylene and perfluoro(alkyl vinyl ether).

15. The process of claim 1 wherein the fluoropolymer process aid is a copolymer of vinylidene fluoride and a monomer selected from hexafluoropropylene and chlorotrifluoroethylene; a copolymer of vinylidene fluoride, tetrafluoroethylene, and hexafluoropropylene; a copolymer of tetrafluoroethylene and propylene and, optionally, vinylidene fluoride; a copolymer of tetrafluoroethylene and hexafluoropropylene; or a copolymer of tetrafluoroethylene and perfluoro(methyl vinyl ether).

16. The process of claim 1 wherein the functional-group-containing monomer is a perfluoro(alkyl vinyl ether) monomer.

17. The process of claim 16 wherein M is an alkali metal cation.

18. The process of claim 16 wherein M is H.

19. The process of claim 16 wherein the functional-group-containing monomer comprises 0.5–40 mole % of the functionalized fluorinated copolymer.

20. The process of claim 16 wherein the functional-group-containing perfluoro(alkyl vinyl ether) has pendant side chains having the structure

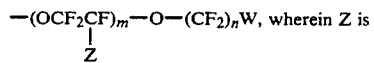

—F or —$CF_3$, m is 0–3, n is 1–5, and W is —$SO_2F$, —$SO_2Cl$, —$SO_3H$, —$SO_3M$, —COOR, —COOH or —COOM wherein R is $C_{1-3}$ alkyl and M is a metal cation or an ammonium or quaternary ammonium cation.

21. The process of claim 20 wherein W is —$SO_3H$.

22. The process of claim 20 wherein W is —$SO_3M$ wherein M is an alkali metal cation.

23. The process of claim 16 wherein the functional-group-containing perfluoro(alkyl vinyl ether) is perfluoro-3,6-dioxa-4-methyl-7-octene sulfonic acid.

24. The process of claim 16 wherein the functional-group-containing perfluoro(alkyl vinyl ether) is sodium or potassium perfluoro-3,6-dioxa-7-octene sulfonate.

25. The process of claim 1 wherein the amount of the functionalized fluorinated copolymer is 0.01 to 0.2 wt. % based on the weight of the polymer resin.

* * * * *